INVENTORS
WILLIAM L. McKOWN
MURRAY E. GALL
ROLF MOEN
VERNE E. WEISS

BY Robert B. Hughes
ATTORNEY

United States Patent Office 3,450,538
Patented June 17, 1969

3,450,538
PROCESS FOR MAKING A READY-TO-EAT BREAKFAST CEREAL WITH A FILLING THEREIN
William L. McKown, Minneapolis, Murray E. Ball, Rockford, Rolf Moen, Hopkins, and Verne E. Weiss, Minneapolis, Minn., assignors to General Mills, Inc., a corporation of Delaware
Filed Sept. 1, 1964, Ser. No. 393,632
Int. Cl. A23l *1/18*
U.S. Cl. 99—81
10 Claims

ABSTRACT OF THE DISCLOSURE

A ready-to-eat breakfast cereal comprised of a foamed, structurally stable filler material substantially enclosed within a dried, puffed and toasted cereal dough shell.

---

This invention relates to a breakfast cereal of the ready-to-eat variety and to a process for making the same.

In attempting to improve the savoriness, nutritional value and other qualities of ready-to-eat breakfast cereals, efforts have long been made to contrive acceptable methods of incorporating many different ingredients with the grain derived portion of the breakfast cereals, and a good deal of this effort has been directed particularly to finding desirable methods of adding fruit, fruit products, and fruit simulated products to the grain derived portion. While the problems encountered generally are, understandably, many and varied, the particular problems involved in utilizing fruit products or fruit simulated products or the like as one of the breakfast food ingredients are especially difficult, and are, to a degree, somewhat illustrative of problems encountered generally in adding many other types of ingredients.

Mixing fresh fruit with breakfast cereal has, of course, long been a popular method of preparing a breakfast dish, so it has for many years been recognized as a desirable end to produce a fruit and cereal product that can be sold as a shelf item to the ultimate consumer, and yet keep some of the character of fresh fruit in the product. It is impractical, of course, to add fresh fruit as an ingredient to be packaged with the finished cereal product (e.g. flakes, biscuits), primarily because of the rapid rate of spoilage of the fruit. Thus the approach has been taken to add dried fruit to the finished cereal product to effect a packaged breakfast cereal having a sufficiently long "shelf life," this having been done commercially with raisins. However, there are problems and limitations in this general approach. It is not desirable to package the fruit and cereal product separately because of the inconvenience to the ultimate consumer. On the other hand, there are difficulties involved in distributing the dried fruit somewhat uniformly throughout the cereal product; and even after this has been accomplished, in the handling of the packaged product either in shipping and afterwards by the consumer, there is with some products a tendency for the fruit to separate from the cereal, and to accumulate and possibly agglomerate.

Beyond the difficulties of accumulation and agglomeration, one of the major problems in so mixing dried fruit and a cereal product is that of the gradual transfer of moisture from the fruit to the cereal product. (For clarity, in discussing generally any breakfast cereal containing a fruit or fruit simulated product, the grain derived or cereal portion, i.e. flakes, biscuits, etc. will be called the "cereal portion" or "cereal product," the fruit related portion, i.e. fruit or fruit simulated portion, will be called the "fruit portion" or "fruit product," and the combination of these, which is generally the total packaged product, will be called a "ready-to-eat cereal," or "ready-to-eat breakfast cereal," or "breakfast cereal.")

What are commercially known as "dried" fruits still have a moisture content generally between fifteen (15%) percent and thirty (30%) percent, while most all cereal products must remain at or below about four (4%) percent in moisture content to stay reasonably crisp. Thus when the fruit is mixed in with the cereal product and permitted to stand for a period of time, the dried fruit will lose moisture to the cereal, with the fruit becoming excessively tough or hard (the degree of toughness depending to some extent on the selection of fruit) and the cereal becoming soggy. It has been alleged that bran flakes, being more flinty than most other flakes, do not show the effects of moisture absorption to the same extent as do the other flakes, and thus have been used in this manner (i.e., mixed with raisins) with some success. However, in this case the choice of cereal product is accordingly limited, as is the choice of fruit, and the dried fruit still has a tendency to be tough due to the dehydration thereof.

Another approach to solve the difficulties of adding fruit or fruit-like products to cereal is to encase dried fruit pieces within moist cereal shreds, and then to toast and dry the product. Although this circumvents the problems of accumulation and agglomeration, there are significant limitations. For example, the fruit pieces must be encased in a shredded cereal product which is alleged to be the only cereal product capable of withstanding the influence of combination with dried fruits, but even so the fruit pieces tend to be tough and the cereal portion less crisp than would be desired. Also there are critical limitations in the manner in which the cereal product must be processed or toasted to obtain the desired quality of the cereal shreds without degrading the fruit pieces, but even when operating within these limitations, there are problems in maintaining a desired fresh fruit character.

Attempts to incorporate fruit into cereal by adding fresh fruit in the form of pastes, purees and juices to cereal doughs which are then made into cereal products have encountered difficulties similar to that just previously mentioned. When the dough with the fruit product is subjected to elevated temperatures involved in cooking or otherwise processing the same, various qualities (e.g. flavor) of the fruit product are degraded.

While the discussion here presented of prior art attempts has been concerned with the utilization of fruit or fruit like products, it is quite apparent that many of the problems related thereto are also encountered when attempting to use other types of ingredients with the grain derived portion of breakfast cereals. Accordingly, it may be stated as a general object of the present invention to provide a new and improved ready-to-eat breakfast cereal, and a process for making the same, in which, in addition to the grain derived ingredient or ingredients ordinarily used in breakfast cereals, other material or ingredients are utilized in a very advantageous manner in the form of a filler so as to circumvent many of the prior art problems.

The product of the present invention can best be described in general terms as a plurality of finished cereal shells or biscuits (which are the grain derived portion of the breakfast cereal) in each of which is a portion of a filler material which is in moisture equilibrium with the shell and is in a structurally stable form in the cavity of each shell. The filler material is inserted into the cereal shells or biscuits only after the biscuits have been made, so that the filler material is not subjected to the elevated processing temperatures required to form a finished cereal biscuit. When this product is eaten in the usual manner (i.e. with milk being poured over the product), the filler material is substantially isolated from the milk by the outer shell or biscuit, and when this shell is broken in the mouth of the person eating the cereal, the filler is exposed, and with the biscuit material produces a very delectable effect.

The process by which this product is achieved can be described quite broadly as first making a finished cereal shell or biscuit, and subsequently filling the same with a material that is expanded and dried in the cavity of the biscuit. The preferred embodiment of the process of the present invention can be described as follows:

(a) making a workable cooked dough;
(b) forming the dough into closed generally flattened pellets having a sealed perimeter and a closed inside surface;
(c) drying the pellets;
(d) puffing and toasting the pellets to form finished cereal shells or biscuits, each with a large closed cavity;
(e) inserting (by means of an injection needle of small diameter) into the cavity of each biscuit a sirup-like filler material, and
(f) expanding and drying the filler, this being advantageously done by vacuum drying the biscuits to form a stable foam structure.

As will become more apparent from the hereinafter disclosed preferred embodiment, the present invention is such that it alleviates in an especially advantageous manner these aforementioned difficulties particularly as they relate to the utilization of "fruit related products," which is meant to include fruit products, fruit simulated products and combinations thereof. (The term "fruit products" as used herein refers to products which comprise fresh fruit or have one or more ingredients derived from fruit so as to have a fresh fruit character. "Fruit simulated products" refers to those which have one or more ingredients which, although not derived from fruit, have the general character of a fruit derived ingredient and thus have a fresh fruit character.) Because of this and in view of the highly desirable product obtained by use in the present invention of fruit related products (i.e. fruit products or fruit simulated products or combinations theerof), it is believed that the use of the same in the present invention is especially significant.

Thus it may be stated as a more specific object to provide such a breakfast cereal and process for making the same in which a fruit product, fruit simulated product or combination thereof is used as a filler, and the aforementioned problems of spoilage, accumulation, agglomeration, moisture transfer from the fruit product or fruitlike product to the cereal product, degradation of the quality of the cereal product and/or the fruit product and other difficulties which are quite problematic in the prior art attempts to produce breakfast cereals with fruit or fruit simulated products, are alleviated.

More particularly, it is an object of the persent invention to provide such a ready-to-eat breakfast cereal and process for making the same, wherein the most desirable qualities of both the cereal portion and the fruit related portion are each maintained to provide a savory, nutritious and generally desirable food product. That is to say, the cereal shell has the crispness, tenderness, toasted quality, nutritional value, flavor and other characteristics generally associated with the cereal or grain derived product of high quality breakfast cereals, and the filling has the fresh fruit flavor, texture nutritional value and other desirable qualities which are generally contemplated as those which should be contributed to the breakfast cereal by adding desirable fruit or fruit simulated material or the like as a part of a ready-to-eat cereal.

Ancillary to this last named object is that of so disposing, and then expanding and drying the filling within the cereal shell that: a large portion of fruit or fruit-like product can be incorporated in the cereal; the fruit or fruit-like filling has a tender foam-like structure which is protected or isolated in the shell, this permitting the incorporating of such a desirable fruit or fruit-like low density product; and when the breakfast cereal is immersed in milk, the filling will "hold up" for a reasonable length of time.

Another object is to provide such a breakfast cereal and process for making the same, which is well adapted to be eaten dry as a snack.

These and other objects and features of the invention will be more readily understood and appreciated from the following detailed description of the preferred embodiments thereof selected for purposes of illustration and shown in the accompanying drawings, in which.

The preferred process of the present invention can be described with more particularity as follows:

PROCESSING THE CEREAL PORTION (A) Ingredients—cereal portion

Figure 1:
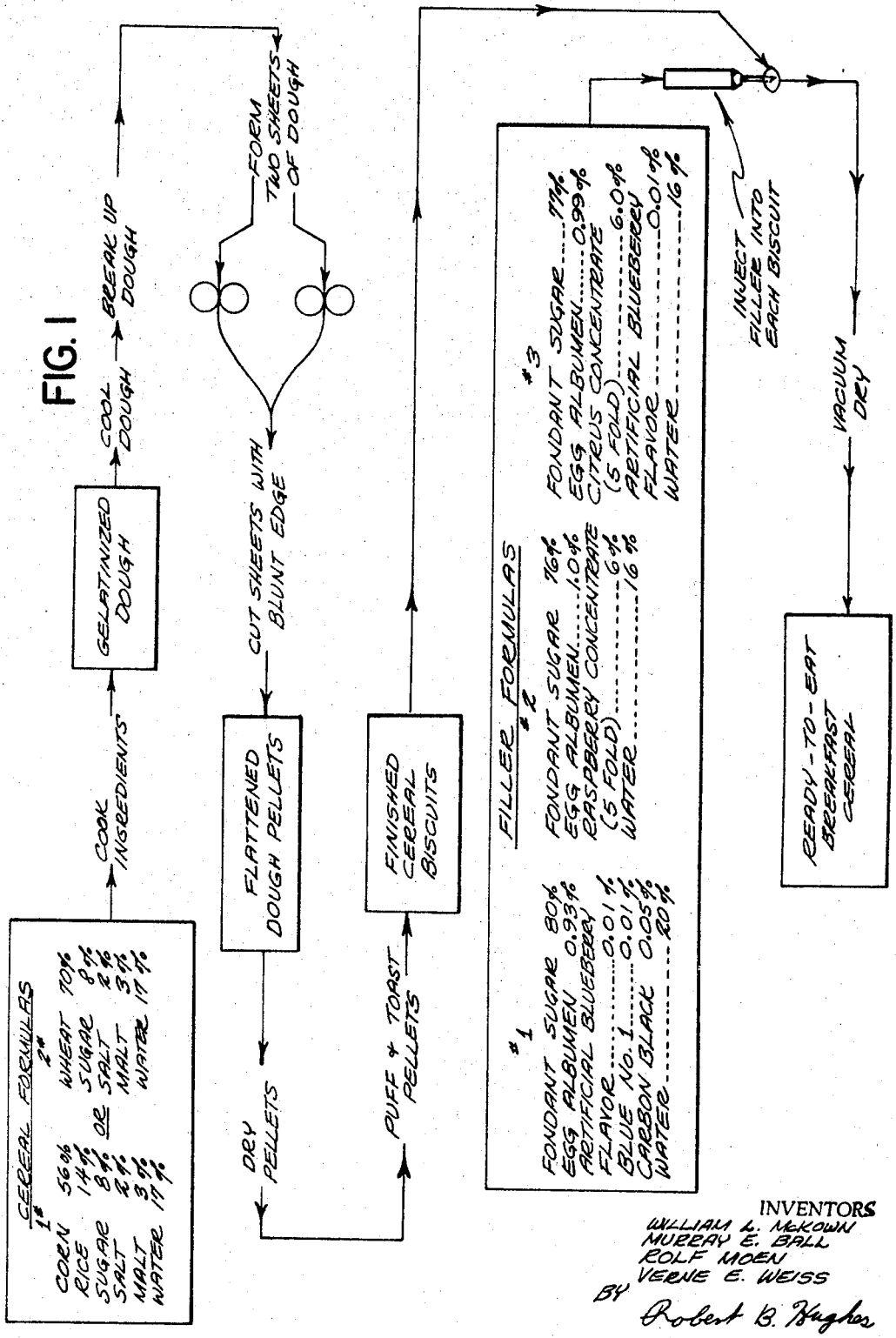
FIGURE 1 is a diagrammatic sketch illustrating in some detail a preferred process of the present invention, with several variations of said process.

Two preferred formulas for the cereal portion are disclosed in the initial portion of the processing diagram of FIGURE 1. The primary ingredients for the cereal formula are grain particles and water; other ingredients (as shown herein, sugar, salt and malt) are added in selected proportions primarily for flavoring. Various types of grains, such as corn, rice, wheat, oats, barley, rye, sorghum, etc., or various combinations thereof could be used in this cereal formula; or other products such as starch could be substituted for or used in combination with such grain products. Also various other flavoring ingredients in place of or in addition to those shown herein, such as molasses or various artificial flavorings could also be used. Since the sugar and possibly some of the other flavoring ingredients react with the endosperm of the grain during the cooking process, the grain is desirably broken up into particles before cooking.

(B) Cooking of cereal portion ingredients

A suitable dough is obtained by mixing and cooking the cereal formula ingredients (i.e. as shown in FIGURE 1, grain particles, water, sugar, salt and malt). One acceptable method of doing this is to pour the separate ingredients into a drum of a pressure cooker, which drum continuously rotates about a horizontal axis during the cooking of the ingredients contained therein. The rotation of the drum not only mixes the ingredients but also insures that they be cooked uniformly. When a batch of 50 lbs. of this cereal formula is cooked in such a pressure cooker at 20 lbs. per square inch pressure gage, the approximate desired cooking time is one hour.

When the dough ingredients are being cooked in a pressure cooker, water is added in the cooking chamber in the form of steam, and some of this moisture is absorbed in the mixture. When the dough ingredients are cooked in smaller batches, there is a greater tendency to pick up moisture. Consequently, the initial amount of water added to the mixture would be less than when the ingredients are being cooked in larger batches. The amount of water initially used in the dough formula in relation to the amount of water added through the cooking process should be such that at the completion of this cooking process the moisture content of the dough is between about 25–35% by weight. Within this range, the dough is at a consistency where it can be shaped and cut to be formed into dough pellets, the optimum moisture content depending on the precise manner in which the dough is so formed into dough pellets. It should be pointed out that when the dough is cooked under pressure, there will be an immediate boiling off of a certain amount of this water when the dough is removed from the pressure cooker because of the immediate reduction of the ambient pressure. The above-indicated range of moisture content of the dough is the moisture after this "flash" or immediate boil off of a portion of the water contained in the dough.

A less time consuming method of mixing and cooking the cereal ingredients to form a properly cooked dough is to premix the dry ingredients and feed these premixed ingredients with water into an extrusion cooker. Such a machine functions to confine the dough under pressure in a chamber and work it mechanically with a high horse power input by means of a rotating auger to mix and "mechanically cook" the ingredients. The dough, having been cooked "mechanically" is discharged by being extruded from the chamber at high pressure through an orifice.

Another possible method of cooking the ingredients to form a dough is to premix the ingredients and then cook them by placing the mixed ingredients on a belt which then carries them through a cooking zone for a predetermined length of time.

There are, of course, various methods by which such ingredients can be cooked to form a workable cereal dough. These are well known in the art, and it is well within the skill of the art to control the processing conditions of these various methods to prepare a workable cooked dough of good quality.

(C) Forming the dough into closed pellets

The task of forming this cooked dough into pellets can be accomplished in various ways. One method is to form the dough into two sheets, one of which overlies the other. The two sheets are then cut both longitudinally and transversely with cutting edges that are somewhat blunt so as to seal the sheets one to another along the lines of cutting, thus forming a plurality of closed pellets.

One convenient method of sheeting the dough involves first cooling the dough and then breaking it up into particles which can be fed through sheeting rolls. Each of two portions of the dough is then fed through a respective one of an upper and a lower pair of sheeting rolls. To describe this more fully, the dough after leaving the cooker, is first carried on a belt with cooling air being blown over the dough, the result of this being to reduce the moisture content of the dough from about 32% (this being the optimum moisture content of the dough leaving the cooker for this particular method of forming dough pellets) to about 28% by weight, and lower the temperature of the dough to a moderate level (between about 80° to 140° F., the desired temperature level being about 100° F.). This cooling makes the dough less sticky so that it is better able to be formed into thin sheets.

Subsequent to this (and prior to the sheeting operation), the dough is reduced into particles of convenient size. These may be about the same size as the grain particles used as one of the dough ingredients so that the dough can more easily be fed into the sheeting rolls. (This size of the grain particles initially used may vary to some extent, depending upon the precise cooking process used, but is desirably such that the particles will pass through a U.S. Standard No. 6 screen and be retained on a U.S. Standard No. 30 screen.) A suitable method of so breaking the dough into particles is to pass the dough through a coarse grinding hammermill, such as those which are commonly used and well known in the prior art.

These dough particles are then divided into two portions, each of which is, as indicated previously, fed through a respective one of an upper and a lower pair of sheeting rolls to form two sheets. It is preferred that the upper roll of the upper pair of sheeting rolls and the lower roll of the lower pair of sheeting rolls be each formed with a plurality of circumferential grooves and a plurality of grooves axially aligned with the axis of the roller so as to be at right angles to the circumferential grooves. This forms a pattern of longitudinal and transverse ridges on the exposed upper face of the upper dough sheet and on the exposed lower face of the lower dough sheet. Thus the inside or adjacent faces of the two sheets are flat, while the exposed surfaces are formed with crisscross ridges which not only add to the appearance of the end product, but, as will be disclosed hereinafter, do have functional value. The depth and spacing of these grooves can vary within reasonable limits, it being found suitable that the thickness dimension from the inner flat surface of each dough sheet to the height of the longitudinal ridges be 0.04 inch, while the thickness dimension from the inner flat surface of each dough sheet to the top of the transverse ridges be 0.03 inch, and the thickness of each of the sheets taken where there are no ridges be .02 inch, the height of the longitudinal and transverse ridges, therefore, being about 0.02 and 0.01 inch, respectively. Suitable spacing for the longitudinal grooves is approximately .065 inch, and for the smaller transverse grooves is about .125 inch.

The two dough sheets, lying one on top of the other, are then cut with a blunt edge or edges both longitudinally and transversely to form a plurality of dual layered square pellets about one-half inch wide, each of which (by virtue of the bluntness of the cutting edge or edges) is sealed along the entire perimeter thereof. The pellets at this stage of the process can be described as somewhat flattened or collapsed, dual-layered, closed pellets having an outer surface with a ridge-like pattern embossed thereon, and a closed inner surface which can be considered as comprising two opposed inwardly directed faces.

It will be readily apparent to those skilled in the art that in forming the finished cereal biscuits or shells, many variations are possible without departing from the broader aspects of the present invention. For example, the sheets of dough, instead of being formed by rolls, could be extruded. However, if the sheets are extruded, it would be difficult, as a practical matter, to form the dough sheets with transverse ridges. Also, it would be possible to extrude or shape a ribbon of the dough in a tubular configuration of a width approximately the same as the desired width of the biscuit to be formed, and to form the individual pellets by cutting the tube of dough transversely with a blunt edge at regular intervals. Further, it is quite evident that various configurations of the dough pellets, other than the square configurations shown herein could be used.

If the dough is extruded rather than fed through sheeting rolls, it is not necessary to cool or break up the dough before extruding. Also, if the rolls are continually cooled during the sheeting operation, there is less tendency for the dough to stick to the rolls, and the aforedescribed step of cooling the dough can be eliminated.

(D) Drying

After the forming of the dough into pellets, these pellets are dried to reduce the moisture content thereof to a level where the pellets are in the best condition for the subsequent puffing and toasting steps. This drying is best accomplished by exposing the pellets to air at about 150° F. The optimum level to which the moisture content of the pellets is reduced depends somewhat upon the precise manner in which the subsequent puffing and toasting of the pellets is accomplished, but is desirably about 12%, and can vary between about 10–15% by weight, without any significant loss in quality in the product.

(E) Puffing and toasting

This puffing and toasting can be described generally as heating the pellets in a manner that there is a relatively high rate of heat transfer thereto, not only to give the pellets (i.e. biscuits) a crispy, toasted flavor, but also to cause an expansion of gasses in the pellets so that not only does the dough material itself become puffed but the two layers of each pellet expand one from another so that there is formed a rounded or pillow-shaped cereal shell or biscuit having a relatively large closed cavity.

Such a shell or biscuit might well be termed a "finished cereal biscuit."

One method of so toasting and puffing the dough pellets is to place the pellets in the chamber of an air oven where hot air is passed through the pellets. The temperature of the air passing through the pellets can vary from about 300–600° F., and the air velocity from 200 feet per minute to 1,500 feet per minute. With maximum temperature and air velocity, the exposure time in the oven is desirably about 6 seconds, while with minimum temperature and air velocity, it is about 3½ minutes. These time, temperature, and air velocity limits are by no means absolute, but are the approximate limits which give generally satisfactory results.

Another method of achieving this toasting and puffing step is to place the dried pellets in an agitated bath of dried salt particles. The heat transfer from the agitated or fluidized salt particles is sufficiently high so that with an ambient temperature of 400° F., the exposure time to the salt bath is about 20 seconds. As in the previously mentioned alternate toasting and puffing process, the processing temperature can be varied oppositely to the cooking time within rather broad ranges and still obtain the desired result.

A third method by which this puffing and toasting of the pellets can be accomplished is to utilize a puffing gun such as those which are well known and commonly used in cereal puffing operations. In such a case the pellets are cooked for about 3 minutes in the presence of steam which is at a pressure of 40 lbs. per square inch. (The temperature of the steam being at or higher than the temperature at which water boils at such pressure.) Here again, the cooking time may be decreased or increased, by respectively, increasing or decreasing the pressure and temperature of the processing steam. At the end of the prescribed processing time in the pressure chamber, the pellets within the pressurized chamber are abruptly exposed to atmospheric pressure. The effect is to create a sizable cavity in each pellet and also to effect the rising or internal puffing of the dough itself which forms the containing wall of the pellet cavity. After this, the pellets are desirably toasted in some manner (e.g. in a radiant oven or an air oven) for a short period to obtain full flavor development and further dry the biscuits.

Subsequent to this puffing and toasting step, the pellets are permitted to cool, thus completing the processing of the cereal portion by itself to form a plurality of individual shells or hollow biscuits. While it is possible and quite practical to vary the processing conditions for this toasting and puffing within rather broad limits, the precise conditions actually used will be determined largely by the flavor, texture and other qualities desired for the end product. The precise moisture content of the finished cereal shell is not critical, except that it should be sufficiently crisp so that it will be hold up when an injection needle is pushed through the shell in the subsequent filling step, and for product desirability the moisture content of the shell of the final product should not be so high that the shell loses its crispness and is somewhat soggy. For most cereal products, with a moisture content as high as 6%, the crispness and general desirability of the product is noticeably degraded. Also, it might be noted that the flavor developed by the puffing gun and subsequent toasting method is somewhat different than the flavor developed with the hot air or salt bath methods, but in all three cases there is a puffing of the pellets along with a high rate of heat transfer to the pellets to achieve a desired flavor development. This is what is referred to as the "puffing and toasting" of the pellets. At the completion of this puffing and toasting, the biscuits are crisp and can be handled with relative ease.

It is necessary, as a practical matter, that the dough sheets which form the pellets be sufficiently thick so that the resulting biscuits will not be too fragile. On the other hand, since the dough expands internally to a greater extent during toasting when the dough is thinner, the thinner the dough sheet is, the more tender will be the biscuits made therefrom. The ridges formed on the exterior of the dough pellets provide structural strength to the biscuit wall, while permitting the biscuit wall to be somewhat thinner so as to make a more tender biscuit. Also, when a fruit or fruit-like material (or other filler material) is injected into the biscuits (as will be disclosed hereinafter) the biscuit shell will hold up to a greater degree by virtue of the crisscross arrangement of ridges.

PROCESSING THE FILLER PORTION

These finished shells or biscuits (having been puffed and toasted and then cooled), are then individually filled with a filling comprising, in the preferred embodiments, a fruit product or a fruit simulated product, or a combination thereof.

(A) Filler ingredients

The formulas for three especially desirable fillers are illustrated in FIGURE 1, the first formula having an artificial fruit flavor, the second a true fruit flavor and the third a combination of true and artificial fruit flavors. It can readily be seen that each of these three formulas comprise four main ingredients: (a) sugar, (b) water, (c) egg albumen, and (d) flavoring.

Sugar is by weight the main ingredient in these preferred filler formulas and provides the "body" of the filler. (Sucrose is desirably used, but other types of sugar could also be used.) Not only is sugar as an ingredient desirable for flavor and nutritional reasons, but it readily lends itself to be mixed with the other ingredients to form a slurry or sirupy liquid which is capable of being injected into the biscuit cavity. Further, the sugar will cooperate with the other ingredients to permit the filling to be puffed and upon the completion of the puffing and drying step will cooperate to form a stable foamed or puffed filling structure. Various other ingredients can be used in place of or in combination with the sugar to give this "body" to the filler. For example, soy flour, wheat flour, starch, and peanut butter were found to be adequate.

Water, of course, gives the filler the desired liquidity so that it can be pushed through an injection needle into the biscuit cavity. Also, during the subsequent vacuum drying step, most of the water boils off at a low temperature to puff or foam the filler and leave a stable, puffed filling structure. It is possible that other liquid ingredients could be used in place of or in combination with water to perform these same functions, provided such other liquid ingredients would not contaminate the product or otherwise degrade the same. However, in view of the general acceptability of water in performing these functions, and the obvious economy in using the same, efforts to find suitable substitutes would be largely academic.

With the ingredients which would more usually be used, such as the ones mentioned herein, the total amount of water in the filler formula can vary from about 10–25%, this depending somewhat upon the exact ingredient formula. At too low a moisture content, the filler (of the type shown in FIGURE 1) becomes excessively thick so that it is difficult to inject the same into the biscuit cavity. While a moisture content above 25% is possible, there is no particular advantage in this since it would cause the subsequent vacuum drying step to be unnecessarily prolonged. This 10–25% range is not by any means absolute, but it covers what would generally be the most practical operating range for a commercial operation. Desirably, in the filler formulas illustrated in FIGURE 1, the water content should be between 15–20%, based upon total weight of the filler.

The egg albumen is added to these filler formulas primarily to give the filler a certain "air holding stability" or cohesiveness so that the filler will puff properly during the vacuum drying process. The amount of egg albumen used can vary within considerable limits, with as little as 0.2% of egg albumen (based on total weight of filler before drying) being sufficient to give the filler formula enough stability so that it will puff sufficiently. As the amount of egg albumen is increased up to about 4%, the air holding stability of the filler increases so that the filler is more easily puffed by vacuum drying, but beyond this amount, there is no appreciable difference in the ease with which the puffing can be accomplished. Other ingredients could be used in the filler formula to give such stability, such as various vegetable gums (e.g. guar gum, locust bean gum, etc.), Irish moss thickening agents, fruit pectins, carboxymethyl cellulose, etc.

In choosing the flavoring ingredient or ingredients for the filling, the field of selection is understandably quite broad, and could include such varied flavoring ingredients as fruit flavors, nut flavors, honey flavor, spice, mint, caramel, malt, coffee, meat, vegetable, maple butter, rum and other liquor, etc. However, since it is of special importance in the present invention to permit the advantageous use of a fruit or fruit simulated product having a fresh fruit character, the selected flavoring ingredients for the filling are, in the preferred embodiments, fruit and fruit simulated products. In the first filling formula, illustrated in FIGURE 1, an artificial blueberry flavor is used with dye ingredients. In the second filling formula, where raspberry concentrate (a true fruit ingredient) is used, the concentrate itself supplies a certain amount of moisture to the filler, so that a lesser amount of water is added as compared to the first filling formula. In the third filling formula, where a citrus fruit concentrate is used in combination with artificial flavoring ingredients, the citrus fruit concentrate itself has sufficient moisture so that no water other than that contributed by the fruit concentrate is needed.

It is apparent that within the broader aspects of the present invention, a great many ingredients could be used in the filler other than those shown herein, provided that the combination of such ingredients are initially sufficiently liquid to be injected into the biscuit and admit of being subsequently puffed and dried. It is possible that the use of one ingredient may well serve the function of one or more of the main filler ingredients shown herein in FIGURE 1. For example, a suitable substitute could be used for sugar, which needs no additional flavoring and/or needs no added ingredient to give it stability so that it will puff. Also, such an ingredient in its normal condition may itself have sufficient moisture content so that no additional water would be needed.

(B) Inserting the filler into the biscuits

Figure 2:
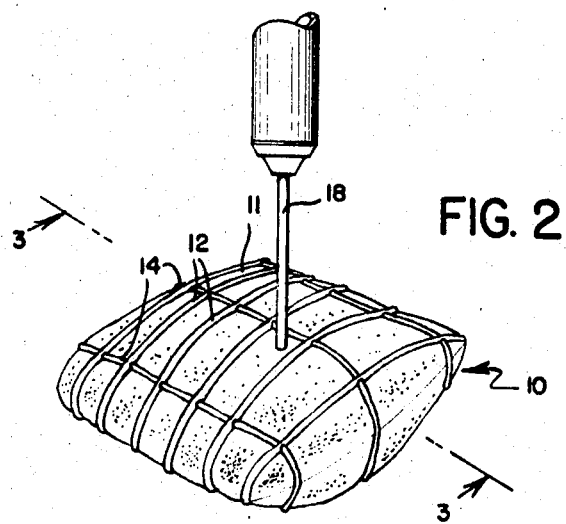
FIGURE 2 is a perspective view illustrating the manner in which filler is injected into a cereal biscuit according to the present invention.
Figure 3:
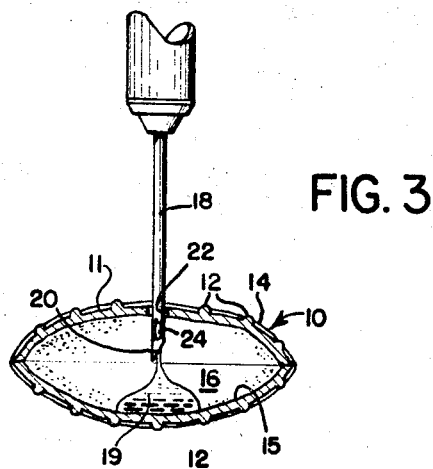
FIGURE 3 is a sectional view taken on line 3—3 of FIGURE 2.

The ingredients of a suitable filler formula are mixed to form a sirupy liquid or a slurry which is injected under pressure into the biscuit cavity. The manner in which this injection step is accomplished is illustrated in FIGURES 2 and 3, wherein is shown a finished shell or biscuit 10, formed by the aforedescribed processing steps and having over its outer surface 11 one set of parallel ridges 12 and a second set of ridges 14 perpendicular thereto. The inner surface 15 of the shell 10 defines a closed cavity 16 into which the filling is inserted by pushing an injection needle 18 through the shell 10 and discharging a portion of filler 19 through the outlet end 20 of the needle 18. Thus the needle 18 pushes a small access hole 22 through the wall of the biscuit 10, and the filler passes through the relatively narrow flow passage 24 of the needle 18 through this hole to be inserted in the cavity 16. The outside diameter of the needle 18 is desirably quite small so that in being pushed through the shell 10 the resulting hole 22 in the shell 10 will be correspondingly small. However, this outside diameter of the needle 18 must be sufficiently large so that the needle 18 can have a flow passage 24 which, although being rather narrow, is of sufficient size to enable the filler to flow through the injection needle 18 at a sufficient rate to deposit the filler 19 in the biscuit in the reasonably short time required in a commercial operation. It should be noted that the ridges 12 and 14 formed on the biscuits help prevent the needle 18 from pushing an excessively large hole through the shell 10 by bracing or reinforcing the shell material adjacent the hole. In using the fillers disclosed herein, a common commercially available injection needle having an outside diameter of .03 inch has been found to be satisfactory.

(C) Vacuum drying

After the injection of the filler 19 into each biscuit cavity 16, the biscuits 10 are vacuum dried to: (1) puff, foam or expand the filler so that it fills at least a substantial portion of the biscuit cavity 16, and (2) remove moisture from the filler, thus forming a structurally stable foamed structure.

The filler, before being foamed, fills a very small portion (i.e. about 5%) of the volume of the biscuit cavity 16, and a suitable proportion by weight is about 30% filler to 70% biscuit. The vacuum drying takes place shortly after the filler is injected into the biscuit 10 so that the moisture in the filler has little chance to be absorbed by the biscuit 10 to any appreciable extent.

During the first portion of the vacuum drying process, the filler expands to fill a substantial portion of the biscuit cavity 16. For the filler formulas shown in FIGURE 1, when the moisture content of the filler reaches about 8%, the filler is somewhat structurally stable. However, the desired moisture content of the cereal shell is about 3% by weight or less, and the desired moisture content of a filler made according to one of the formulas in FIGURE 1, to be in moisture equilibrium with the shell, is very close to this 3% level. Thus the drying is continued until the overall moisture content of the shell and filler is at this approximate 3% level. The precise moisture level is not critical, except in the sense that if the moisture content of the shell becomes too high, e.g. as high as 6%, it loses its desired crispness and becomes somewhat soggy. (And of course, the filler should be sufficiently dry to be structurally stable in its foamed condition.) Also, if the formula is such that the filler is quite hygroscopic in comparison to the shell, the moisture content of the filler would, of course, be correspondingly higher than the moisture level of the shell, so as to be in moisture equilibrium with the shell. It is to be understood that since the foamed filler made according to the formulas in FIGURE 1 are somewhat stable structurally at about 8% moisture content, the latter part of drying the same does not have to be done in a vacuum, but can be carried on at a higher pressure (e.g. atmosphere), provided that the drying temperatures are kept at a moderate level. But as a practical matter, it has been found to be most convenient to simply continue the vacuum drying until the overall moisture content of the shell and filler is such that when the two come to moisture equilibrium, the shell is at about 3% moisture level. (It is to be understood that immediately after the completion of the vacuum drying, the shell and the filler may not be exactly in moisture equilibrium, but will reach this condition after standing for a moderate period of time.)

In vacuum drying the biscuits having a filler made according to one of the filler formulas of FIGURE 1, it has been found suitable that the air surrounding the biscuits be reduced from atmospheric to about 75 millimeters of mercury (absolute pressure). One method of accomplishing this is to place the filled biscuits in a closed chamber at atmospheric pressure and then draw the air out of this chamber by means of a vacuum pump until the pressure reaches this level of 75 millimeters of mercury. For best results, this pressure drop should proceed fairly quickly (i.e. in about 30 seconds or less for the particular filler of FIGURE 1) to insure proper puffing of the filler. The pressure in the chamber is held at this 75 millimeter level for about two to ten minutes (with the filler formulas indicated in FIGURE 1) after which the biscuits are removed from the chamber in their finished form.

Another method of accomplishing the vacuum drying process is to move the filled biscuits through a pressure seal valve, such as a star valve, into a chamber in which the pressure is 75 millimeters of mercury, and keep the biscuits in the chamber for a period of about two to ten minutes. The filled biscuits are then moved from the chamber through another pressure seal valve to the atmosphere. It is, of course, within the skill of the art to vary the time and pressure of this vacuum drying to achieve the desired puffing and drying. Various changes in the filler formula may make such changes desirable. However the pressure should not be so high (i.e. over about 200 millimeters of mercury) that the temperature at which water boils off is so high as to degrade the quality of the filler.

During the vacuum drying, the biscuits will be losing heat because of the loss of moisture as gas or vapor. Hence, while being dried, the biscuits are heated by infrared lamps to maintain the temperature of the biscuits at a level at which the water in the filler will boil off. (For a pressure level of 75 millimeters of mercury, this temperature will be moderately above room temperature.) The vacuum drying period can be shortened or lengthened by increasing or decreasing, respectively, the amount of heat delivered to the product. However, the filler is at no time subjected to any temperature extremes which would degrade the fresh fruit character of the filler. Subsequent to the vacuum drying process, the ready-to-eat breakfast cereal biscuits are in their finished form and may be packaged for eventual consumer use.

When this finished ready-to-eat cereal is placed in a bowl with milk, each shell isolates its filler from the milk for a period of time. Thus when this breakfast cereal is eaten and the shells become crushed in the chewing of the cereal, the tender and flavorful foamed filler becomes exposed, and this filler in combination with the cereal biscuit gives a very desirable overall taste.

The vacuum drying step disclosed herein is believed to be, in a commercial operation, an especially advantageous method of accomplishing the puffing and drying of the filler. In the one step of vacuum drying, not only is the filler puffed, but the moisture content is reduced to the desired level, with the filler taking the form of a structurally stable foamed structure and the shell remaining crisp. However, variations in accomplishing the same will readily suggest themselves to those skilled in the art. It is impractical, generally speaking, to foam the filler prior to injecting the same in the biscuit cavity, since, as a practical matter, the injecting must take place under pressure and the required pressure would ordinarily break down the foamed cell structure of the filler. However, it is possible to inject filler into the finished cereal shells or biscuits while they are in a partial vacuum, so that some degree of puffing or foaming will take place almost immediately as the filler material leaves the injection needle and enters into the low pressure environment that would exist in the biscuit cavity.

Also, as indicated previously, the method and conditions under which the filler is expanded and dried depend somewhat upon the exact filler formula used. As indicated previously although the filler formulas given in FIGURE 1 provide an especially delectable and commercially practical filler material, many variations which hold some promise of merit are possible (for example, as mentioned previously, substitutes for the sugar to provide the "body" of the filler and possibly contribute certain desirable characteristics, substitutes for the water to provide liquidity, etc.). Experimental excursions through all such possible filler materials could be an almost endless task. But simply giving thought to the various filler formula ingredients which could be used suggests in turn further variations as to the manner in which the various possible fillers could be expanded. Thus within the broader concepts of the present invention, the use of leavening is contemplated, or the use of a gas which is dissolved in the filler at high pressure and then inserted into the biscuit cavity at a lower pressure (e.g. atmospheric) to release the gas and expand the filler. It is to be kept in mind of course that for this product to be a shelf item, the filler material must be in substantial moisture equilibrium with the cereal shell, which should be less than about 6% moisture content. Thus if water provides for the filler the liquidity needed for the filler to be injected through a needle into the shell, consideration must be given to disposing of this water, this being solved in the preferred embodiment of the process by the vacuum drying of the filled biscuits. Accordingly, if it is desired to expand the filler by means other than vacuum drying, steps should be taken to bring the moisture level of both the shell and the filler to the desired level.

The invention will be disclosed with more particularity in the following examples:

EXAMPLE I

The ingredients of the following formula are mixed in a ribbon blender:

| | Percent |
|---|---|
| Corn meal | 66 |
| Rice flour | 16 |
| Sugar | 9 |
| Salt | 3 |
| Malt sirup (diastatic) | 3 |
| Coconut oil | 3 |

This mixture is then cooked in an auger extruder of the type made by Sprout-Waldron Company, of Muney, Pa., described in its bulletin No. 224. In the operation of this extruder, moisture is added to the ingredients being cooked, and the cooked dough emerging from this extruder is at about a 25% moisture content. The cooked dough from the extruder is then fed through a pair of rolls to form a sheet of pliable dough. This sheet is doubled over to form two layers, and these two layers are cut both transversely and longitudinally with a blunt edge to form flattened square pellets, each of which is sealed about its entire perimeter. Air at about 150° F. is blown through the pellets until they reach a moisture content of about 12%. These pellets are then placed in a fluid bed air toasting oven of the type made by Proctor and Schwartz Company, the temperature in the oven being 475° F. and the residence time therein being about 20 seconds. The product taken from the oven is a plurality of finished closed cereal biscuits, each of which is formed with a relatively large cavity. An injection needle is pushed through the wall of each biscuit and a portion of a filler is inserted through the injection needle into each biscuit cavity. This filler is previously made by mixing in a planetary mixer the ingredients of the filler formula No. 1 given in the accompanying drawing. Approximately 0.07 gram of this filler is injected into each biscuit cavity. The biscuits are then placed in a vacuum oven, the pressure in the oven being 75 millimeters of mercury, and the residence time of the biscuits being about 3 minutes. Infrared lamps are used to transmit heat to the biscuits while they are in the vacuum oven. The finished product is taken from the oven and has an overall moisture content of about 3%. The filler in each biscuit is a foamed structurally stable material which fills a substantial portion of the cavity of each biscuit.

EXAMPLE II

The same process is followed as in Example I, except that the dough is made from the ingredients from the following formula:

| | Percent |
|---|---|
| Wheat middlings | 82 |
| Sugar | 9 |
| Salt | 3 |
| Malt | 3 |
| Coconut oil | 3 |

EXAMPLE III

The same process is followed as in Example I, except that the filler is made from the ingredients of filler formula No. 2 given in the accompanying drawing.

EXAMPLE IV

The same process is followed as in Example I, except that the filler is made from the ingredients of filler formula No. 3 given in the accompanying drawing.

EXAMPLE V

The same process is followed as in Example I, except that the filler is made by mixing three parts of a commerically available homogeneous peanut butter with one part water.

It should be understood that the foregoing is merely illustrative of a certain embodiment of the invention and many variations may be made by those skilled in the art without departing from the spirit and scope of the invention.

Now therefore we claim:

1. A process for making a unit of ready-to-eat breakfast cereal, said process comprising: first, making a finished cereal dough shell which has been dried, puffed and toasted and which has a substantially closed cavity; second, subsequent to the making of said shell inserting in the shell a filler; third, expanding and drying said filler to the extent that the filler occupies a substantial portion of said cavity.

2. The process as recited in claim 1, wherein said filler is inserted by pushing relatively thin injection needle means having a discharge passage through said shell to communicate with said cavity, and injecting said filler through the discharge passage of said needle means into said cavity.

3. The process as recited in claim 1, wherein said shell is formed with a plurality of ridges which reinforce said shell to minimize breakage thereof when said needle means is pushed through said shell.

4. The process as recited in claim 1, wherein said filler is, prior to being expanded, at a state of relatively high density at a predetermined level of pressure and by reducing the pressure from said predetermined level, said filler is puffed by a resulting gaseous expansion within said filler.

5. The process of claim 1 where the filler is expanded and dried in one step by vacuum drying.

6. The process as recited in claim 5, wherein the pressure at which said vacuum drying takes place is at least as low as about 200 millimeters of mercury.

7. A process for making a unit of a ready-to-eat breakfast cereal, said process comprising first, making a finished cereal dough shell which has been dried, puffed and toasted, and which has a substantially closed cavity, subsequent to the making of said shell inserting into said shell a fruit related sirupy material containing at least as much as about 10% moisture, and vacuum drying said shell with said material so as to expand and dry said material to form a structurally stable fruit related foamed structure which occupies a substantial portion of said cavity.

8. The process as recited in claim 7, wherein said vacuum drying takes place at a pressure below at least as low as about 200 millimeters of mercury.

9. The process as recited in claim 7, wherein said shell and filler is dried to an overall moisture level where with the filler and shell in moisture equilibrium, said shell is at a moisture level below about 6%.

10. A process for making a ready-to-eat breakfast cereal, said process comprising:
 (a) making a workable cooked dough,
 (b) forming and cutting said dough with blunt edge means to form sealed, generally flattened dough pellets having a dual layered configuration;
 (c) drying said pellets,
 (d) puffing and toasting said pellets so as to expand each of said pellets to form shells of a generally expanded configuration with a relatively large closed cavity,
 (e) inserting into each shell by injection needle means a portion of a sirupy heat sensitive filler material, which portion occupies a relatively small part of the volume of the cavity of its related pellet,
 (f) vacuum drying said pellets to boil off moisture of said filler to expand each filler portion to occupy a substantial part of the volume of its related shell, said vacuum drying being done at a pressure sufficiently low so that the moisture boils at a temperature below a temperature at which the quality of said filler is degraded, and said vacuum drying being carried on to the extent that each filler portion forms a structurally stable foamed structure.

References Cited

UNITED STATES PATENTS

| | | | |
|---|---|---|---|
| 1,630,924 | 5/1927 | Cieslak | 107—1 |
| 1,770,337 | 7/1930 | Hood | 107—1 |
| 1,787,900 | 1/1931 | Goff | 107—1 |
| 2,693,419 | 11/1954 | Gager | 99—83 |

RAYMOND N. JONES, Primary Examiner.

U.S. Cl. X.R.

99—83